United States Patent [19]

Thompson

[11] 4,110,996

[45] Sep. 5, 1978

[54] METHOD AND APPARATUS FOR RECOVERING VAPOR

[75] Inventor: Max W. Thompson, Sweeny, Tex.

[73] Assignee: Phillips Petroleum Company, Bartlesville, Okla.

[21] Appl. No.: 792,736

[22] Filed: May 2, 1977

[51] Int. Cl.² ............................................ F17C 13/00
[52] U.S. Cl. ...................................................... 62/54
[58] Field of Search .......... 62/54; 220/85 VR, 85 VS; 55/88

[56] References Cited

U.S. PATENT DOCUMENTS

| | | | |
|---|---|---|---|
| 1,371,427 | 3/1921 | Kerr | 62/394 |
| 2,001,996 | 5/1935 | Whitman | 62/54 |
| 2,475,957 | 7/1949 | Gilmore | 62/27 |
| 2,488,813 | 11/1949 | Garretson | 62/54 |
| 2,876,865 | 3/1959 | Cobb | 62/27 |
| 3,186,182 | 6/1965 | Grossman | 62/26 |
| 3,266,262 | 8/1966 | Moragne | 62/54 |
| 3,889,485 | 6/1975 | Swearingen | 62/54 |
| 3,919,852 | 11/1975 | Jones | 62/54 X |

*Primary Examiner*—Allen M. Ostrager

[57] ABSTRACT

A method and apparatus for recovering condensable vapor which is expelled from a container during filling by collecting and compressing the vapor after which the compressed vapor is cooled by cooling means. Upon cooling, a portion of the vapor is condensed after which the condensate is separated from the vapor in a separator. The vapor portion is then placed into heat transfer relation with heat exchange means which is operable to further cool and condense the vapor. The heat exchange means uses a portion of the vapor as the coolant after the vapor has been expanded through expansion means to effect cooling of the coolant vapor. The vapor used as the coolant is then conducted to a point of use. The recovered liquefied portion of the vapor can be returned to the container from which the vapor was displaced.

17 Claims, 2 Drawing Figures

METHOD AND APPARATUS FOR RECOVERING VAPOR

There are many apparatuses known in the art for recovering vapors displaced from a tank during filling wherein the vapor is liquefied to facilitate storage thereof. Such apparatus is typically used for recovery of vapors expelled from a container which stores vaporous liquids such as hydrocarbons which would typically include gasoline and the like. The vapor expelled usually includes non-condensable gases such as air and also includes condensable vapor from the volatile liquid in the tank. The concentration of the condensable vapor is a function of the vapor pressure of the volatile liquid and the tank temperature and can be estimated by use of Raoult's law. The vapor is treated so as to prevent economic loss and pollution of the atmosphere by expelling vapor into the atmosphere. Also, present governmental regulations prohibit expelling the vapor into the atmosphere for pollution reasons and also expelled vapor, if the vapor is combustible, poses a safety hazard from explosion or fire. It is desirable to liquefy the expelled vapor so as to facilitate storage thereof and to place same in a more useable state since the expelled vapor is generally not economically useable as a vapor at or near the container.

Apparatuses are known in the art wherein the expelled vapor is cooled to effect liquefaction thereof. The cooling is normally accomplished by direct contact with a compatible liquid coolant or by indirect contact with a coolant in a heat exchanger. The use of indirect heat exchange poses efficiency problems particularly in those recovery systems which are a compressor to first compress the expelled vapor before the vapor is liquefied. The present invention provides a more efficient apparatus by the use of a portion of the expelled vapor as a coolant for indirect heat exchange with a portion of the expelled vapor. Such an apparatus effects more efficient utilization of the work already put into the system. Since the vapor is already compressed and complete liquefaction of all the condensable vapor is normally not economically feasible, it has been found that by the use of the apparatus as disclosed herein that a major portion of the condensable vapor can be liquefied and still utilize some of the work input into the system in a more efficient manner by using a portion of the compressed vapor as a coolant by flowing same through a vapor expansion means to effect cooling of the coolant vapor. The coolant vapor cools another portion of the vapor to effect liquefaction of a portion thereof. The coolant vapor which is a minor portion of the total expelled vapor can then be conducted to a point of use such as for a fuel or the like. The liquefied portion of the vapor can be returned to the tank from which the vapor was initially expelled.

The principal objects and advantages of the present invention are: to provide a method and apparatus for recovering vapor expelled from a tank or container during filling of same wherein a portion of the expelled vapor is liquefied with the remaining portion of the expelled vapor being used as a coolant to help liquefy the expelled vapor; to provide such a method and apparatus which operates with increased efficiency by utilizing work put into the system which normally would go to waste; and to provide such a method and apparatus which is well adapted for its intended use, simple in construction and operation and efficient in operation.

Other objects and advantages of the present invention will become apparent from the following detailed description taken in connection with the accompanying drawings wherein are set forth by way of illustration and example certain embodiments of the present invention.

Figure 1:
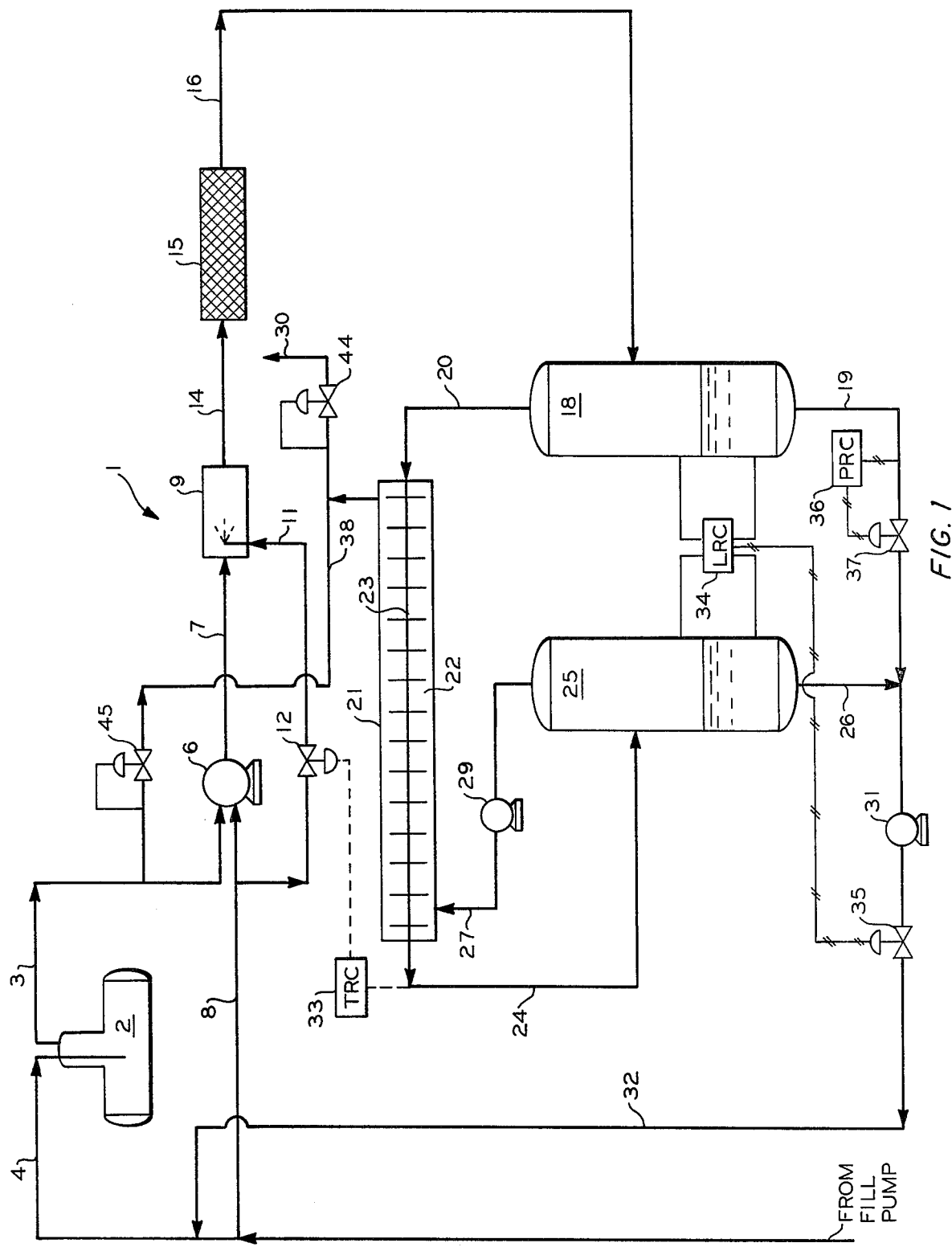
FIG. 1 is a diagrammatic illustration of an apparatus for liquefying vapor expelled from a container.

Referring more in detail to the drawings:

The reference numeral 1 designates generally an apparatus operable for liquefying a portion of the vapor expelled from a container 2 while it is being filled with a liquid which displaces the vapor. The vapor essentially contains condensable components of the fluid being transferred and non-condensable components such as air. As the liquid fills the container 2 the vapor contained therein is expelled from the container through a conduit 3. Liquid used to fill the container 2 is conducted to the container 2 via a conduit 4. The vapor expelled through the conduit 3 is conducted to the apparatus 1 which is operable for liquefying a portion thereof. The apparatus 1 includes a compressor 6 which has the low pressure side thereof in downstream flow communication with the conduit 3 and has a conduit 7 communicating with the high pressure side thereof for conducting compressed vapor from the compressor 6. Preferably, the compressor 6 is of a liquid seal type wherein a conduit 8 is connected to the compressor 6 as is known in the art to supply a compatible liquid thereto. Preferably, the conduit 8 is connected to the conduit 4 whereby liquid used to fill the container 2 is also used to form the liquid seal in the compressor 6. This is advantageous in that the liquid flowing to the compressor 6 is compatible with the vapor expelled from the container 2.

Downstream of the compressor 6 there is cooling means 9 which is in flow communication with the conduit 7 whereby compressed vapor flowing through the conduit 7 flows into the cooling means 9. The cooling means 9 can be of any suitable type which is operable for cooling the compressed vapor to a temperature of up to approximately 120° F. (49° C.) and preferably between a temperature of 40° F. and 120° F. (4° C. and 49° C.). In a preferred embodiment, the cooling means 9 is of a direct contact between liquid and vapor type wherein a cooling liquid is injected into the cooling means 9 via a conduit 11 which is in turn connected to a source of liquid coolant. In the preferred embodiment, the conduit 11 is in communication with the conduit 4 as for example by being connected to the conduit 8. Also, it is advantageous to provide a flow control valve 12, connected in the conduit 11, adapted for remote control for a purpose to be later described. By contact between the liquid coolant and the compressed vapor, a portion of the vapor is liquefied with the liquid and vapor being discharged from the cooling means 9 for flow along a discharge conduit 14 which is in communication therewith. The fluid mixture of liquid and vapor is then preferably passed to mixing means 15. The mixing means 15 is in downstream flow communication with the conduit 14 and is operable to effect mixing of the vapor and liquid flowing thereinto. Since some liquefaction of the vapor can be accomplished by absorption of the vapor by the liquid, some of this can occur in the mixing means 15 and can also occur in the cooling means 9. The mixing means 15 can be of any suitable type such as a static mixing device as is known in the art. The mixing means 15 has a discharge with a conduit 16 in flow communication therewith for conducting the fluid mixtures of vapor and liquid from the mixing means 15.

There is in flow communication with the conduit 16, for receiving the vapor and liquid flowing therethrough, a separating means 18 which is operable for separating the vapor and liquid mixture into separate phases wherein the liquid phase settles in the bottom of the separating means 18 and the vapor phase collects in an upper portion of the separating means 18. Any suitable separating means can be used as for example a flash drum or knock-out drum which is in essence a vessel having a hollow interior. The collected liquid can be discharged through a lower discharge conduit 19 connected to the separating means 18. Although the above description is equally applicable for the form of the invention shown in FIG. 2, the following description pertains particularly to the form of the invention shown in FIG. 1.

A vent conduit 20 is in flow communication with the upper portion of the separating means 18 wherein vapor contained within the separating means 18 is discharged through the conduit 20 for flow to heat exchange means 21 which is in downstream flow communication with the separating means 18 which is operable for cooling the exhausted vapor from the separating means 18 to further liquefy same. The heat exchange means can be of any suitable type and is preferably of an indirect contact type wherein the coolant introduced into the coolant side 22 effects heat removal from the vapor flowing through the cooled side 23, thereby liquefying a portion of the vapor. After the vapor and liquid have passed through the cooled side 23, which can be a bundle of tubes or a fin type tube, the vapor and liquid are discharged into a conduit 24 which provides flow communication between the cooled side 23 and a second separating means 25. The fluid discharged from the heat exchange means 21 into the conduit 24 contains vapor and liquefied vapor which has been liquefied due to the decrease in temperature thereof. Preferably, the temperature of the cooled side 23 is maintained at a temperature of up to about 120° F. (49° C.) and preferably between 40° F. and 120° F. (4° C. and 49° C.) to effect partial liquefaction of the vapor passing therethrough. The vapor and liquefied vapor then flow through the conduit 24 into the separating means 25 which can be similar to the separating means 18 wherein the vapor phase and liquid phase separate with the liquid phase collecting in the bottom of the separating means 25 for discharge through a conduit 26. The vapor phase is discharged through a vent conduit 27 which effects flow communication between the separating means 25 and the coolant side 22 of the heat exchange means 21. Since the vapor is compressed by the compressor 6, same is available as a refrigerant or coolant if same is expanded. The conduit 27 has connected therein expansion means 29 which is operable to allow expansion of the vapor by a reduction in the pressure thereof from a pressure of about 30 psia to 200 psia (207 kPa to 1380 kPa) to a reduced pressure of between 15 psia and 20 psia (103 and 138 kPa) wherein the temperature of the coolant vapor is up to about 100° F. (38° C.) and preferably between 100° F. and −100° F. (38° C. and −73° C.). The expansion means can be of any suitable type such as an expansion valve but more preferably same is of a type which, exclusive of heat loss to the atmosphere, permits a reduction in the enthalpy or heat content of the vapor passing therethrough. Such a device can be a turbine or the like wherein the reduced enthalpy or heat content can be converted into useable work available at the shaft of the turbine. The expanded vapor then enters the coolant side of the heat exchange means 21 to effect cooling of the vapor flowing through the cool side 23. After the heat exchange process, the coolant vapor is discharged from the heat exchange means 21 via a discharge 30 wherein the exhausted vapor can be conducted to a point of use which can be any suitable use such as flaring or as a fuel for heating or the like.

In the illustrated structure, the discharge conduit 26 is in flow communication with the conduit 19 which has a pump 31 connected thereto for returning the liquefied vapor collected in the separating means 18 and 25 to storage and preferably back to the container 2 via a conduit 32 which is connected to the conduit 4. By the use of the above-described system, approximately 30 percent to 98 percent of the expelled condensable vapor is recovered as liquefied vapor in the separating means 18 and 25 while the remaining portion of the vapor is discharged to use through the discharge 30.

Control means is provided to effect control of the operation of the above-described apparatus and as shown a temperature regulator controller 33 is operably connected to the valve 12 for operation thereof in response to temperature sensed at the outlet of the heat exchange means 21 whereby the amount of coolant introduced into the cooling means 9 is controlled in response to the temperature of the fluid in the conduit 24, i.e., the higher the temperature of the fluid in the conduit 24, the greater the amount of coolant introduced into the cooling means 9. A level controller 34 is operably associated with the separating means 18 and is operable for controlling the level of liquid therein. Also, if the separating means 18 and 25 are positioned at about the same level (as shown) the level controller 34 can also be operably associated with both separating means and control the levels of liquid in both. A flow control valve 35 is connected in the conduit 32 and is operably connected to the level controller 34 whereby the higher the level of liquid in the separating means 18, the more discharge of liquid there is allowed through the conduit 32. Also, a pressure regulator controller 36 is operable for sensing pressure in the conduit 19 and is also operably connected to a flow control valve 37 and is operable to balance the pressure drop from drum 18 to drum 25 and thus allow the control of the liquid level in both drums with a single level regulator controller.

If desired, a bypass conduit 38 can be connected in flow communication between the conduit 3 and the discharge 30. A suitable pressure regulator means 44 is connected to the discharge 30 and is operable for maintaining a nominal back pressure in the heat exchanger 21. This helps stabilize the system pressure downstream of the expansion means 29 and also prevents accidental entry of air into the system through the discharge 30. The conduit 30, as shown, is provided with a suitable pressure regulator 45 between the conduit 3 and discharge 30. This assures that there will always be a source of fluid to the compressor 6 and prevents pulling a vacuum on the tank 2. The pressure regulator 45 set point preferably is at a setting slightly above atmospheric pressure so that normally there will be no flow through the conduit 38.

Figure 2:
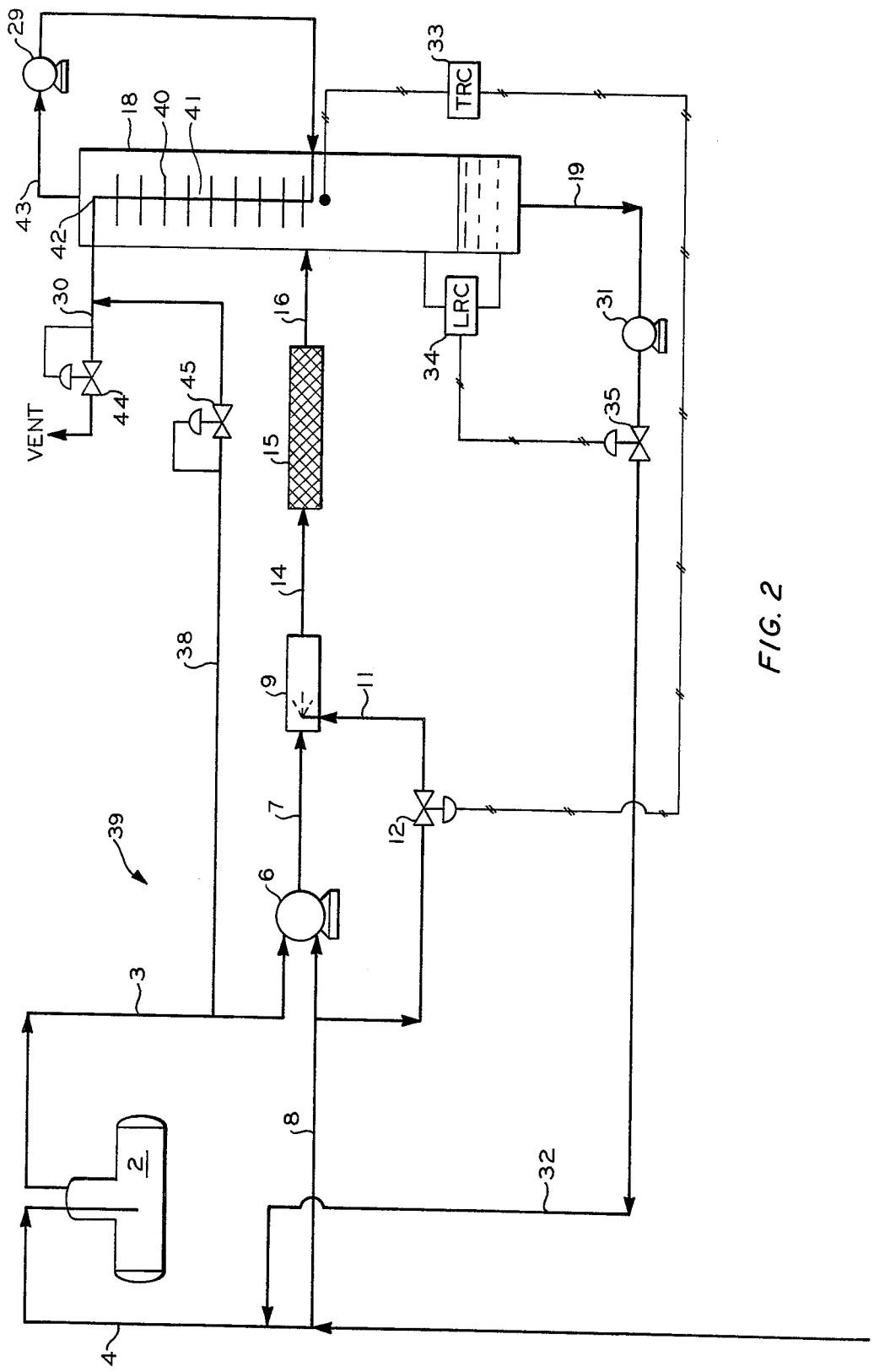
FIG. 2 is a diagrammatic illustration of a modified form of apparatus used for liquefying vapor.

FIG. 2 shows a modified form of the present invention wherein like numbers designate like or similar parts or structure as the apparatus of FIG. 1. The reference numeral 39 designates generally the modified form of the invention wherein a container 2 has an outlet thereof connected to the compressor 6 which compresses the expelled vapor and the compressed vapor is conducted to the cooling means 9 via the conduit 7 and after cooling, the vapor and liquefied portion of the vapor is conducted to the mixing means 15 by the conduit 14. After mixing the liquefied portion of the vapor and the vapor, the fluid mixture is conducted to the separating means 18 by the conduit 16. In the form shown, the heat exchange means 40 is positioned inside or in the interior of the separating means 18 and is operable for indirect contact cooling of vapor contained within the separating means 18 wherein the cooled side 41 is the exterior of the heat exchange means and the coolant side 42 is the interior of the heat exchange means 40. A discharge conduit 43 is in flow communication with the vapor containing portion of the separating means 18 and is operable to conduct a portion of the vapor therein which is at a pressure of between 30 psi and 200 psi (207 kPa and 1380 kPa) to the coolant side 42 of the heat exchange means 40. Positioned or connected in the conduit 43 is the expansion means 29 which is operable similar to that described above. The heat exchange means 40 has the discharge 30 in communication with the coolant side 42 to discharge the coolant to a point of use as described above. The temperature regulator controller 33 has the sensing portion thereof positioned adjacent the heat exchange means 40 in the separating means 18 to sense the temperature of the vapor adjacent the heat exchanger 40. Operation of the modified form 39 is similar to that operation of the apparatus 1 wherein a portion of the vapor expelled from the container 2 is used as a coolant after compression and expansion to cool a portion of the expelled vapor to effect partial liquefaction thereof.

EXAMPLE

The above-described invention is better understood by a review of the calculated example provided below. The container 2 such as a railroad tank car is being loaded with 90° F. (32° C.) normal hexane at a rate of approximately 157 gallons per minute (0.099 cubic meters/second). The vapor expelled through the conduit 3 is 154 pounds per hour (0.0194 kg/s) of which 87.6 pounds per hour (0.011 kg/s) is normal hexane and the remainder is air. The vapor is compressed by the compressor 6 from approximately atmospheric pressure to about 50 psia (345 kpa). After compressing, the vapor is contacted with a spray of normal hexane at a rate of approximately 5,350 lbs/hr (0.675 kg/s). The mixed phase of vapor and liquefied vapor is passed through the mixing means 15 and then to the separating means 18 which is operating at 100° F. (38° C.) and 50 psia (345 kpa). The vapor separated in the separating means 18 is passed to the heat exchanger 21 wherein 90 lb/hr (0.0113 kg/s), which is 26 weight percent n-hexane, passes through the cooled side of the heat exchanger where it is partially condensed or liquefied at a temperature of 58° F. (14° C.) and 50 psia (345 kpa) after which the mixed phase fluid of vapor and liquefied vapor flow to the second separating means 25. The vapor phase separated in the separating means 25 is then passed though the expansion means 29 at a rate of 76 lbs/hr (0.0096 kg/s) with the vapor being 11.9 weight percent n-hexane wherein the stream after expansion is at a temperature of approximately −27° F. (−33° C.) at 15 psia (103 kpa). This vapor stream passes through the coolant side 22 of the heat exchanger and after cooling the fluid flowing through the cooled side 23, it is then exhausted through the discharge 30. The liquids separated in the separating means 18 and 25 total 7,418 lbs/hr (0.936 kg/s) are then returned to the container 2 through the conduit 32 and the conduit 4. The pump 31 can conveniently be powered by the expansion means 29 if same is a turbine. For the above conditions, the system which expels 87.6 lbs/hr of n-hexane from the container 2 only 9.0 lbs/hr (0.0011 kg/s) is discharged through the discharge 30 wherein the n-hexane recovery is approximately 90 percent of the vapor discharged from the container 2.

It is to be understood that while I have illustrated and described certain forms of my invention it is not to be limited to the specific form or arrangement of parts herein described and shown.

What is claimed and desired to be secured by letters patent is:

1. A method of recovering vapor expelled from a container during filling with a vaporous liquid, said method comprising the steps of:
   (a) conducting expelled vapor to a compressor means;
   (b) compressing said expelled vapor;
   (c) cooling the thus compressed vapor to a temperature sufficient for condensing a portion of the compressed vapor, forming a first vapor portion and a first liquid portion;
   (d) separating the first vapor portion from the first liquid portion;
   (e) cooling the thus separated first vapor portion by indirect contact with a coolant for condensing a portion of the first vapor portion to form a second vapor portion and a second liquid portion;
   (f) separating the second vapor portion from the second liquid portion; and
   (g) expanding the thus separated second vapor portion and using the thus expanded second vapor portion as at least a portion of said coolant.

2. The method as set forth in claim 1 wherein:
   in the step of expanding, the second vapor portion is expanded in first means operable for reducing the enthalpy of the second vapor portion.

3. The method as set forth in claim 2 wherein:
   the enthalpy lost by expansion in the first means is converted into work.

4. The method as set forth in claim 3 wherein:
   the first means includes a turbine.

5. The method as set forth in claim 3 wherein:
   the expelled vapor is compressed in a compressor to a pressure of at least about 30 psia.

6. The method as set forth in claim 5 wherein:
   said compressor is a liquid seal type compressor wherein liquid is introduced into the compressor as a sealant.

7. The method as set forth in claim 3 wherein:
   the step of cooling the compressed vapor is effected by direct contact with a compatible liquid having a temperature of up to about 120° F.

8. The method as set forth in claim 3 including:
   conducting said first and second liquid portions to said container.

9. Method of recovering vapor expelled from a container during filling, said method comprising the steps of:
   (a) compressing expelled vapor to a pressure in the range of about 30 to about 100 psia;

(b) cooling the compressed vapor by contact with a compatible liquid coolant to a temperature sufficiently low to at least partially condense said compressed vapor;

(c) mixing said coolant and the thus partially condensed compressed vapor to form a first condensed portion and a first uncondensed vapor portion;

(d) separating the first condensed vapor portion from the first uncondensed vapor portion;

(e) cooling the thus separated first uncondensed vapor portion by indirect contact with a second coolant for further condensing at least a portion of first condensed vapor portion to form a second condensed vapor portion and a second uncondensed vapor portion;

(f) separating the second condensed vapor portion from the second uncondensed vapor portion;

(g) recovering the first condensed vapor portion and the second condensed vapor portion;

(h) expanding the second uncondensed vapor portion through a turbine for effecting cooling of the second uncondensed vapor portion and using the thus expanded second uncondensed vapor portion for at least a portion of the second coolant;

(i) recovering the thus expanded second uncondensed vapor portion after the expanded second uncondensed vapor portion has been used for cooling; and (j) conducting the recovered first condensed vapor portion and the second condensed vapor portion to the container from which vapor was expelled.

10. An apparatus for recovering vapor expelled from a container during filling with a liquid, said apparatus including:

(a) a compressor in flow communication with a container for flow of vapor expelled from the container to the compressor, said compressor having a high pressure outlet;

(b) liquefying means communicating with the compressor outlet for receiving compressed vapor from the compressor, said liquefying means having an outlet;

(c) first liquid-vapor separating means communicating with the liquefying means outlet, said first separating means having a vapor outlet;

(d) heat exchange means associated with the first separating means and being in heat transfer relation with vapor separated in the first separating means, said heat exchange means being of the indirect contact type having a coolant side and a cooled side;

(e) conduit means communicating with said separating means and said heat exchange means for conducting vapor between said separating means and the coolant side of the heat exchange means;

(f) vapor expansion means communicating with said conduit means for expanding vapor flowing through said vapor expansion means and effecting a temperature decrease of the vapor before the expanded vapor flows to the coolant side of the heat exchange means; and (g) vent means communicating with the coolant side of the heat exchange means for discharge of vapor from the heat exchange means.

11. The apparatus as set forth in claim 10 wherein:
(a) said heat exchange means is positioned in the interior of the separating means for cooling vapor in the first separating means.

12. The apparatus as set forth in claim 11 wherein:
(a) said expansion means is of a type operable to reduce the enthalpy of the vapor therein during flow of vapor therethrough.

13. The apparatus as set forth in claim 12 wherein:
(a) said expansion means includes a turbine.

14. The apparatus as set forth in claim 10 wherein:
(a) said heat exchange means is positioned exteriorly of said separating means and has the cooled side communicating with the separating means for receiving vapor therefrom, said heat exchange means has an inlet and an outlet with vapor flowing from the inlet to the outlet.

15. The apparatus as set forth in claim 14 including:
(a) a second separating means communicating with the heat exchange means outlet and operable for separating fluid discharged from the heat exchange means into a vapor phase and liquid phase, said second separating means has a vapor outlet; and
(b) second conduit means communicating with the second separating means vapor outlet and the coolant side of the heat exchange means, said vapor expansion means is connected in said second conduit means between the separating means outlet and the coolant side of the heat exchange means.

16. The apparatus as set forth in claim 15 wherein:
(a) said expansion means is of a type operable to reduce the enthalpy of the vapor therein during flow of vapor therethrough.

17. The apparatus as set forth in claim 16 wherein:
(a) said expansion means includes a turbine.

* * * * *